United States Patent [19]

Turley

[11] 4,139,023

[45] Feb. 13, 1979

[54] PIPE THREAD PROTECTOR

[76] Inventor: William M. Turley, 3752 1/2 Lewis, Long Beach, Calif. 90813

[21] Appl. No.: 857,128

[22] Filed: Dec. 5, 1977

[51] Int. Cl.² ............................................. B65D 59/06
[52] U.S. Cl. .................................................. 138/96 T
[58] Field of Search ................... 138/96 T, 96 R, 109; 16/2, 108

[56] References Cited

U.S. PATENT DOCUMENTS

| 1,674,998 | 6/1928 | Spang | 138/96 T |
|---|---|---|---|
| 2,551,834 | 5/1951 | Ferguson | 138/96 T |
| 3,056,427 | 10/1962 | Higgins | 16/108 |
| 3,844,532 | 10/1974 | Buck | 16/2 |
| 4,033,380 | 7/1977 | Weber | 138/96 T |

Primary Examiner—Richard E. Aegerter
Attorney, Agent, or Firm—Fulwider, Patton, Rieber, Lee & Utecht

[57] ABSTRACT

A pipe thread protector for use in protecting the threaded ends of a pipe against damage prior to the time the threaded ends of the pipe are engaged with the ends of other lengths of pipe. The pipe thread protector is formed of a resilient material and has a cup-shaped body which overlies the pipe threads to be protected. The outermost portion of the body is formed with threads complementary to the pipe threads. Inwardly of the protector body threads, the protector body is formed with a plurality of tapered wedging ribs. These wedging ribs automatically center the body of the protector upon the pipe end as the protector is urged over the pipe end for subsequent engagement of the protector threads with the pipe end threads. The wedging ribs thereafter frictionally restrain the protector against rotation relative to the pipe end.

8 Claims, 9 Drawing Figures

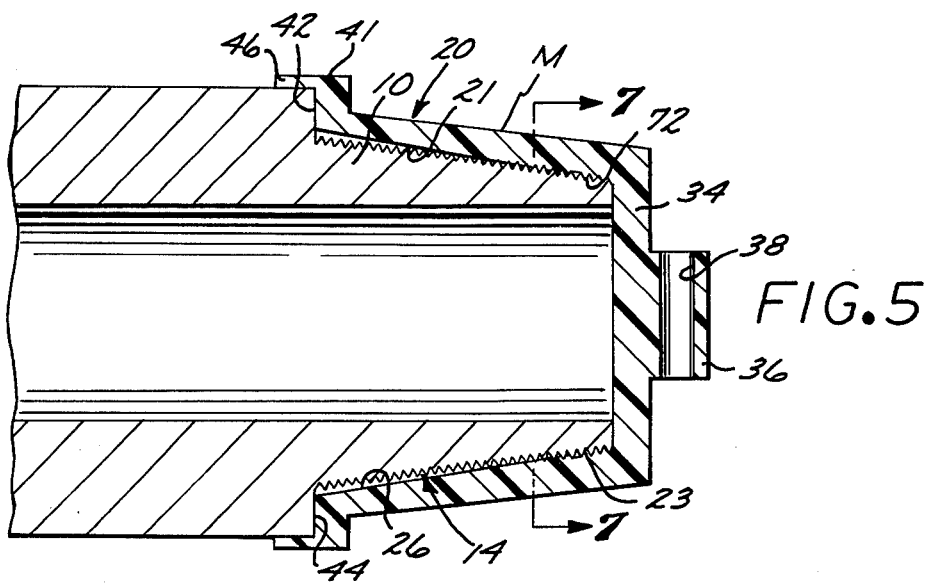
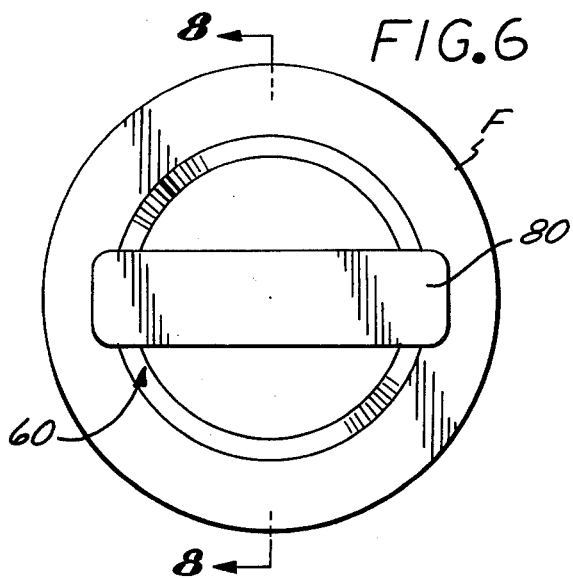
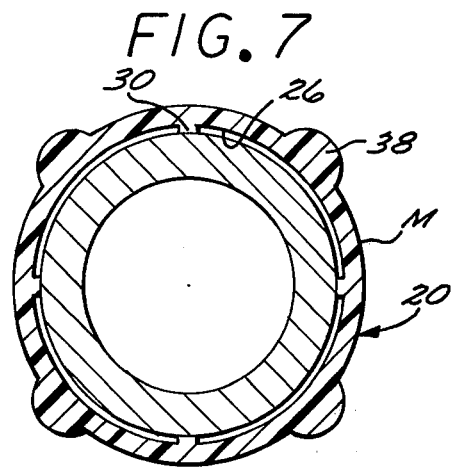
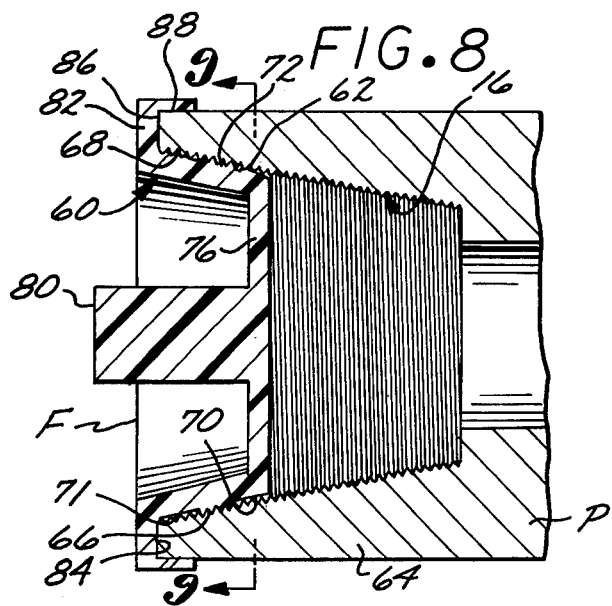
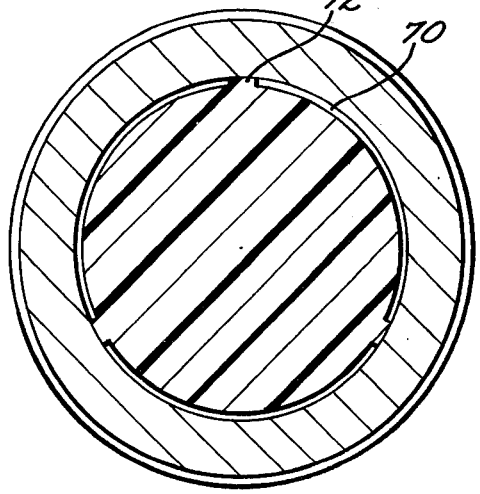

PIPE THREAD PROTECTOR

BACKGROUND OF THE INVENTION

1. Field of the Invention

This invention relates to pipe thread protectors, and more particularly, to a protector for protecting the threaded end of a section of oil well pipe prior to the time the pipe is threaded into a string of other similar pipes.

2. Description of the Prior Art

In the drilling and production of oil and gas wells, a string of pipes are employed. The term "pipes" as used herein refers to drill pipe, casing or tubing. Such pipes are provided at their opposite ends with male and female tapered threaded portions. These male and female threaded portions cooperate to secure the pipe together in a string extending from the earth's surface downwardly into the earth. Various protectors for such threaded pipe ends have been heretofore proposed. Generally, these pipe thread protectors are of a resilient material, as for example, Neoprene. In the use of such pipe thread protectors, the protectors are initially jammed over the ends of the pipe and temporarily affixed thereto either by mechanical means or by complementary threads formed on the protectors. It is essential that the protectors be applied to and removed from the pipe threads in a minimum amount of time so as not to delay well drilling or production operations. It is also essential that the pipe thread protectors remain securely in place on the pipe ends until such time as they are to be removed.

SUMMARY OF THE INVENTION

The pipe thread protector of the present invention is of simple and rugged construction, and is economical to manufacture. It may be applied to and removed from the threaded ends of a pipe in a minimum amount of time and with a minimum expenditure of labor, no special tools being required.

The pipe thread protector of the present invention is also usable with both male and female threaded pipe ends.

It is a particular object of the present invention to provide a protector for tapered threads formed on a pipe end having a cup-shaped body provided with side walls having threads solely on their outermost portion for engaging the outermost of the pipe threads, with the side walls tapering at a greater angle than the taper of the pipe threads inwardly of the body threads. The body is formed inwardly of the main body threads with a plurality of tapered wedging ribs that serve to engage the threaded pipe end and thereby automatically center the body of the protector relative to the pipe as the protector is urged axially over the pipe end. The wedging ribs also frictionally restrain the protector against inadvertent rotation relative to the pipe end after the protector has been threaded onto such pipe end.

BRIEF DESCRIPTION OF THE DRAWINGS

Preferred embodiments of the pipe thread protector embodying the present invention are described in detail hereinafter and are illustrated in the accompanying drawings which form a part hereof and wherein:

FIG. 5 is a vertical sectional view taken in enlarged scale along line 5—5 of FIG. 4;

FIG. 6 is a vertical view taken in enlarged scale taken along line 6—6 of FIG. 4;

FIG. 7 is a vertical sectional view taken along line 7—7 of FIG. 5;

FIG. 8 is a vertical sectional view taken along line 8—8 of FIG. 6; and

FIG. 9 is a vertical sectional view taken along line 9—9 of FIG. 8.

DESCRIPTION OF THE PREFERRED EMBODIMENTS

Figure 1:
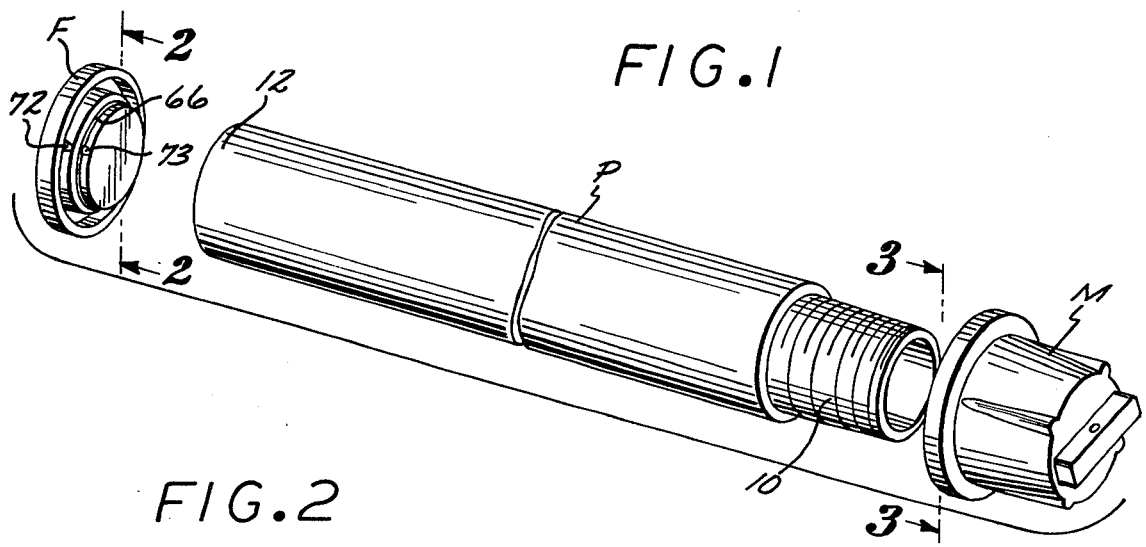
FIG. 1 is a perspective view of a pipe provided with male and female threaded ends which respectively receive male end and female end protectors embodying the present invention.
Figure 2:
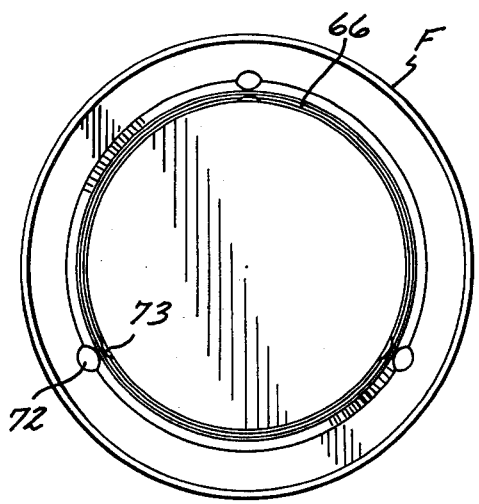
FIG. 2 is a vertical view taken in enlarged scale along line 2—2 of FIG. 1 and showing a female end pipe thread protector embodying the present invention.

Referring to the drawings, there is shown a length of pipe P which, for the sake of example, may consist of casing, drill pipe or tubing utilized in the drilling and production of oil or gas wells. One end of pipe P is formed with a male or pin section 10 while the opposite end thereof is formed with a female or box section 12. The pipe sections 10 and 12 are adapted to receive, respectively, a male end pipe thread protector M and a female end pipe thread protector F embodying the present invention. Such pipe thread protectors M and F protect the external threads 14 of the male pipe end 10 and the internal threads 16 of the female pipe end 12.

Figure 3:
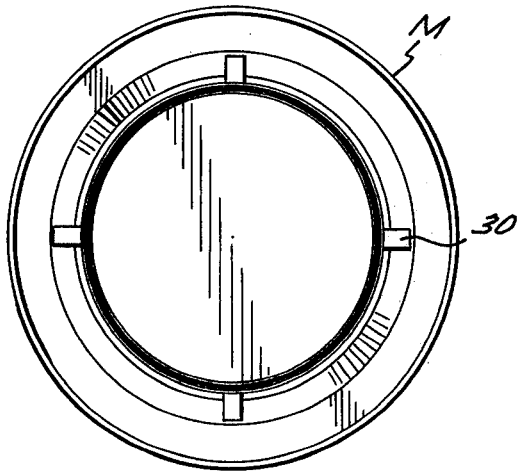
FIG. 3 is a vertical view taken in enlarged scale along line 3—3 of FIG. 1 and showing a male end pipe thread protector embodying the present invention.
Figure 4:
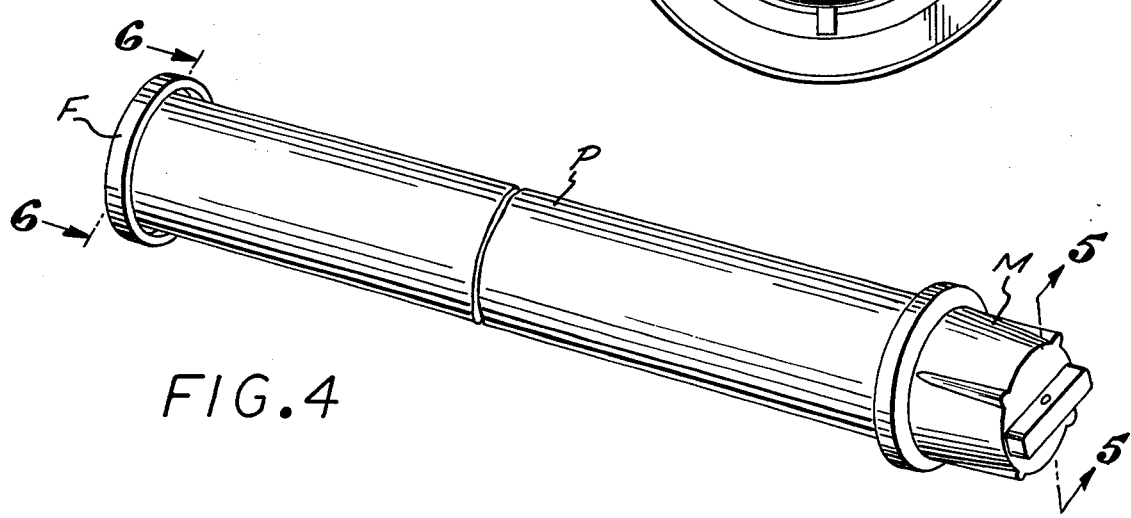
FIG. 4 is a view similar to FIG. 1, but showing the pipe thread protectors positioned upon the opposite ends of the pipe.

More particularly, the male end pipe thread protector M embodying the present invention is formed of a resilient material, as for example, a natural or synthetic rubber, such as Neoprene. Pipe thread protector M includes a cup-shaped body 20 having internal side walls 21 which taper axially inwardly and radially outwardly relative to the male pipe end 10 (FIG. 5). Side wall 21 is formed at its outermost portion with internal threads 22 engageable with the complementary threads 23 formed at the outer portion of pin section 10. Axially inwardly of threads 22 the internal side wall 21 is tapered axially inwardly and radially outwardly at a greater angle than the taper of the male pipe end section 10 to define a circumferential space shown at 26. Protector body 20 is also formed inwardly of its threads 22 with a plurality (such as four) of wedging ribs 30 of like configuration (FIGS. 3 and 7). These wedging ribs 30 taper radially outwardly and axially inwardly at an angle substantially corresponding to the angle of pin section 10, but the radially inner surfaces of such wedging ribs 30 extend radially inwardly to a distance slightly greater than the outer diameter of pin section 10.

The outermost ends of the side walls 20 are integrally connected with a radially extending cover 34. The outer end of cover 34 is formed in turn with a transverse wrench lug 36. The exterior of body 20 is formed with a plurality of axially extending gripping protrusions 38. These gripping protrusions 38 are engageable manually or with suitable wrenching means to effect rotation of the pipe thread protector M relative to the pipe P. An alternative means for effecting such rotation takes the form of a radially extending passage 40 formed in lug 36 to removably receive a screwdriver handle, rod or the like (not shown).

The axially innermost ends of side walls 20 are integrally formed with a collar 41, the axially inner surface 42 of which engages the shoulder 44 of pin section 10. Collar 41 is in turned formed with an axially inwardly extending lip 46 which is telescopically engageable with the pipe P adjacent the inner end of pin section 10.

In the use of the aforedescribed male end pipe thread protector M, such protector will initially be disposed as indicated in FIG. 1, i.e., axially outwardly of pin section 10. To engage the protector M with pin section 10, such protector is jammed axially towards pipe P. As the protector moves axially inwardly over pin section 10, the wedging ribs 30 will first contact the threads 14 of pin section 20. Such contact will immediately center protector body 20 relative to pipe P. Accordingly, the threads 22 of protector body 20 will accurately and promptly engage with their complementary threads 23 formed at the outer portion of pin section 10. Thereafter, protector M will be rotated so as to screw such protector onto pin section 20. The dimensions of protector M relative to pin section 10 should be so selected that as the protector threads are tightened axially inner surface 42 of collar 41 will abut shoulder 44 of pin section 10, with lip 46 telescopically engaging the exterior surface of pipe P just inwardly of the pin section. With the protector M so positioned upon pin section 10, such pin section will be completely protected against damage due to inadvertent contact with hard objects. Moreover, dirt and the like will be prevented from contact with the threads of pin section 10. It is important to note that inasmuch as the inner diameter of wedging ribs 30 is slightly greater than the outer diameter of pin section threads 14, such wedging ribs will frictionally restrain protector M against rotation relative to pin section 10 thereby effectively but releasably locking protector M in place.

It should also be noted that by positioning gripping protrusions 38 circumferentially offset relative to wedging ribs 30, adequate flexibility is provided for the protector body 20 to flex slightly outwardly as the wedging ribs 30 are moved axially inwardly along the pin section 10.

Referring now additionally to FIGS. 2, 6, 8 and 9, the female end pipe thread protector F is also provided with a generally cup-shaped body 60. As indicated in FIG. 8, body 60 is provided with external side walls 62 which taper axially inwardly and radially inwardly relative to the female or box section 64 of pipe P. Side wall 62 is formed at its intermediate portion with external threads 66 complementary to and engageable with the outer threads 68 of the threads 16 of box section 64. Axially inwardly of threads 66 external side wall 62 is tapered axially inwardly and radially inwardly at a greater angle than the taper of the box section 64 to define a circumferential space indicated particularly at 70. Protector body 60 is also formed axially outwardly and inwardly of its threads 68 with a plurality (such as three) of wedging ribs 72 and 73, respectively. These wedging ribs 72 and 73 taper axially inwardly and radially inwardly at an angle substantially corresponding to the angle of the box section 64 but the radially inner surfaces of such wedging ribs extend radially outwardly to a distance slightly greater than the inner diameter of the box section 64.

The axially inner ends of side walls 62 are integrally connected with a radially extending cover 76. Such cover is in turn integrally formed with a transverse wrenching lug 80 which extends axially outwardly beyond the outer end of the protector F. The axially outer ends of side walls 62 are integrally formed with an integral collar 82, the axially inner surface 84 of which engages the outer shoulder 86 of box section 64. Collar 82 is in turn formed with an axially inwardly extending lip 88 which is telescopically engageable with the exterior of the pipe P adjacent the outer end of box section 64.

It will be apparent that the operation of female end protector F is substantially the same as that of the male end protector M set forth hereinabove.

It will also be apparent that various modifications and changes may be made with respect to the foregoing detailed description without departing from the spirit of the present invention.

I claim:

1. A protector for the tapered threads formed at one end of a pipe, such protector being formed of a resilient material and comprising:

a cup-shaped body having tapered side walls, one side of which is formed at its outermost portion with threads that engage solely the outermost of said pipe threads to temporarily retain said protector upon said one end of said pipe with the portion of said side wall axially inwardly of the threads of said side wall tapering at a greater angle than the taper of said one end of said pipe to define a circumferential space;

a radially extending cover integrally connecting one end of said side walls;

a plurality of axial wedging ribs formed on the threaded wall of said main body within said space and extending towards the axially inner end of said body and tapering at an angle substantially corresponding to the angle of said pipe threads, said wedging ribs serving to engage said pipe threads and thereby automatically center said body upon the end of said pipe as said protector is urged axially over the pipe end to be thereafter rotated whereby the body threads will engage the outer threads of the pipe end; and with said wedging ribs frictionally restraining said protector against rotation relative to the pipe end.

2. A protector as set forth in claim 1 wherein:
the pipe end is male and the main body threads are formed on the interior side wall of said main body.

3. A protector as set forth in claim 1 wherein:
the pipe end is female and the main body threads are formed on the exterior sidewall of said main body.

4. A protector as set forth in claim 1 wherein:
the pipe end is formed with a radially extending shoulder adjacent the pipe threads, and the end of the protector body side wall opposite said cover is formed with an integral collar that abuts and protects said shoulder.

5. A protector as set forth in claim 2 wherein:
said body is formed with a plurality of axially extending gripping protrusions circumferentially spaced from said wedging ribs.

6. A protector as set forth in claim 2 wherein:
the pipe end is formed with a radially extending shoulder at the inner end of said pipe thraeds, and the inner end of the protector body side wall is formed with an integral collar that abuts and protects said shoulder.

7. A protector as set forth in claim 3 wherein:

the pipe end is formed with a radially extending shoulder at the outer end of said pipe threads, and the outer end of said protector, and the body side wall is formed with an integral collar that abuts and protects said shoulder.

8. A protector as set forth in claim 7 wherein:
said body is formed with a plurality of axially extending gripping protrusions circumferentially spaced from said wedging ribs.

* * * * *